Sept. 20, 1949.  R. D. DOWNING ET AL  2,482,251
DETACHABLE POWER DRIVE CONNECTION
Filed Oct. 24, 1945  3 Sheets-Sheet 2
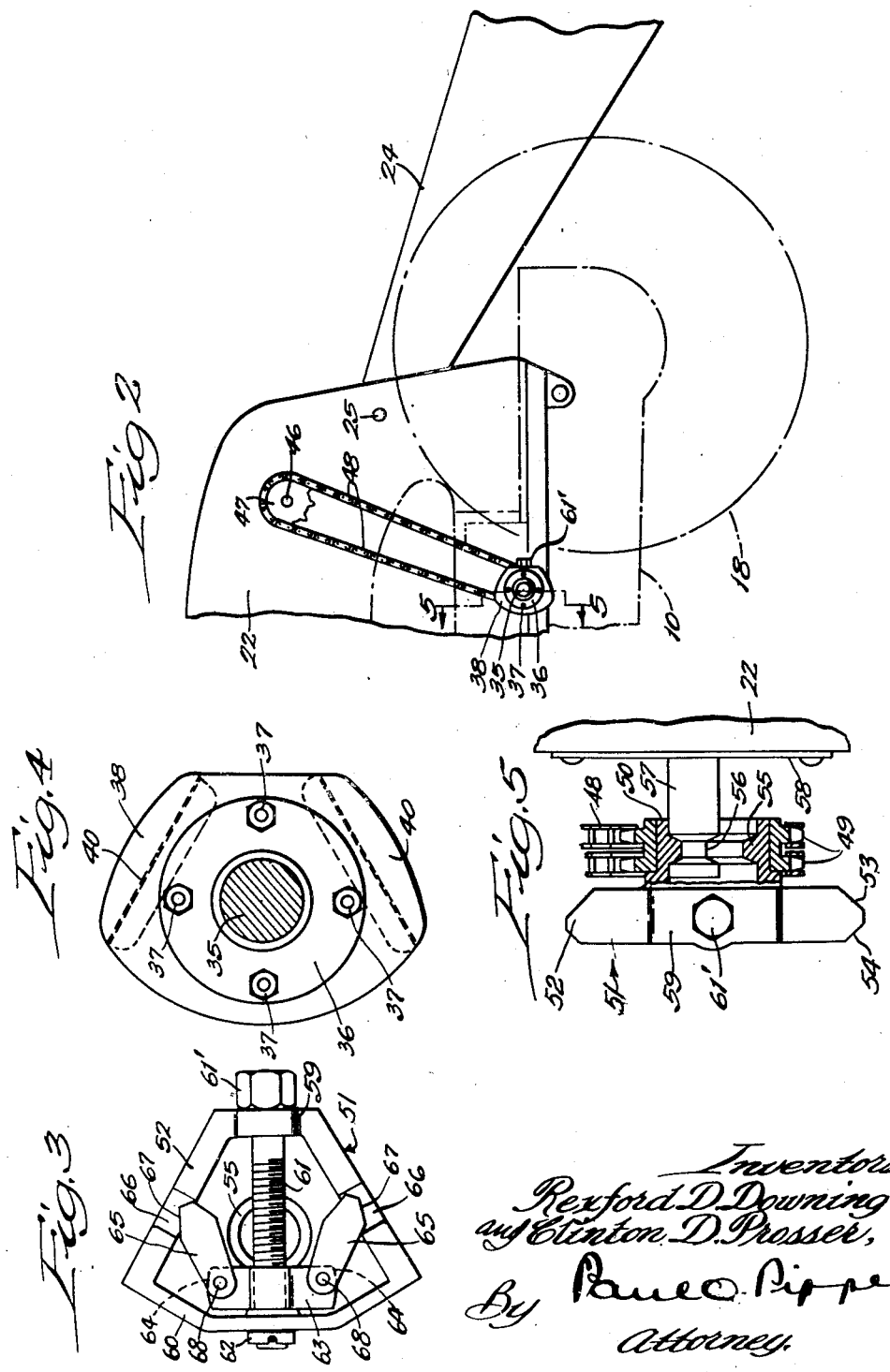
Inventors:
Rexford D. Downing
and Clinton D. Prosser,
By Paul C. Pippel
Attorney.

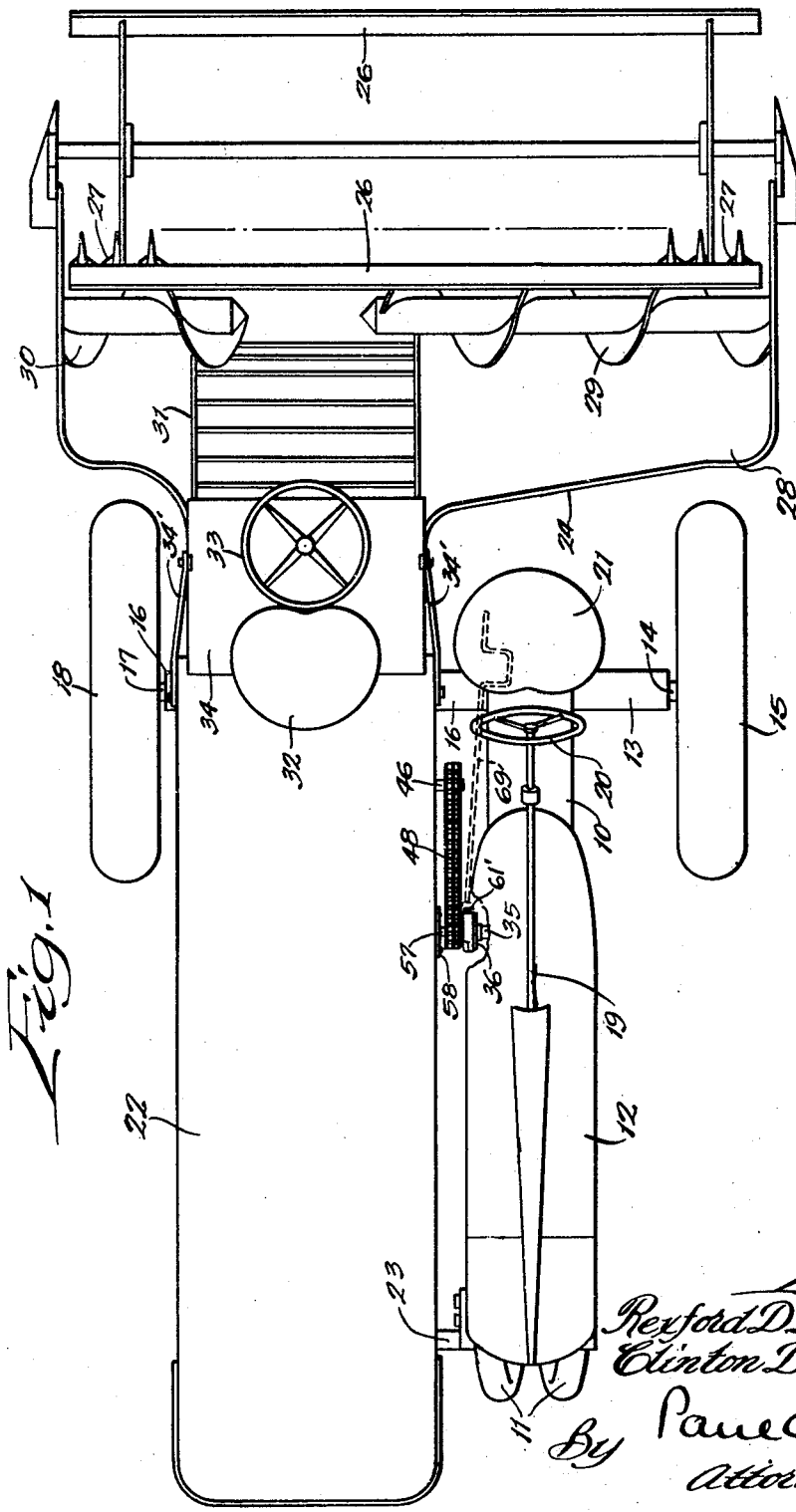

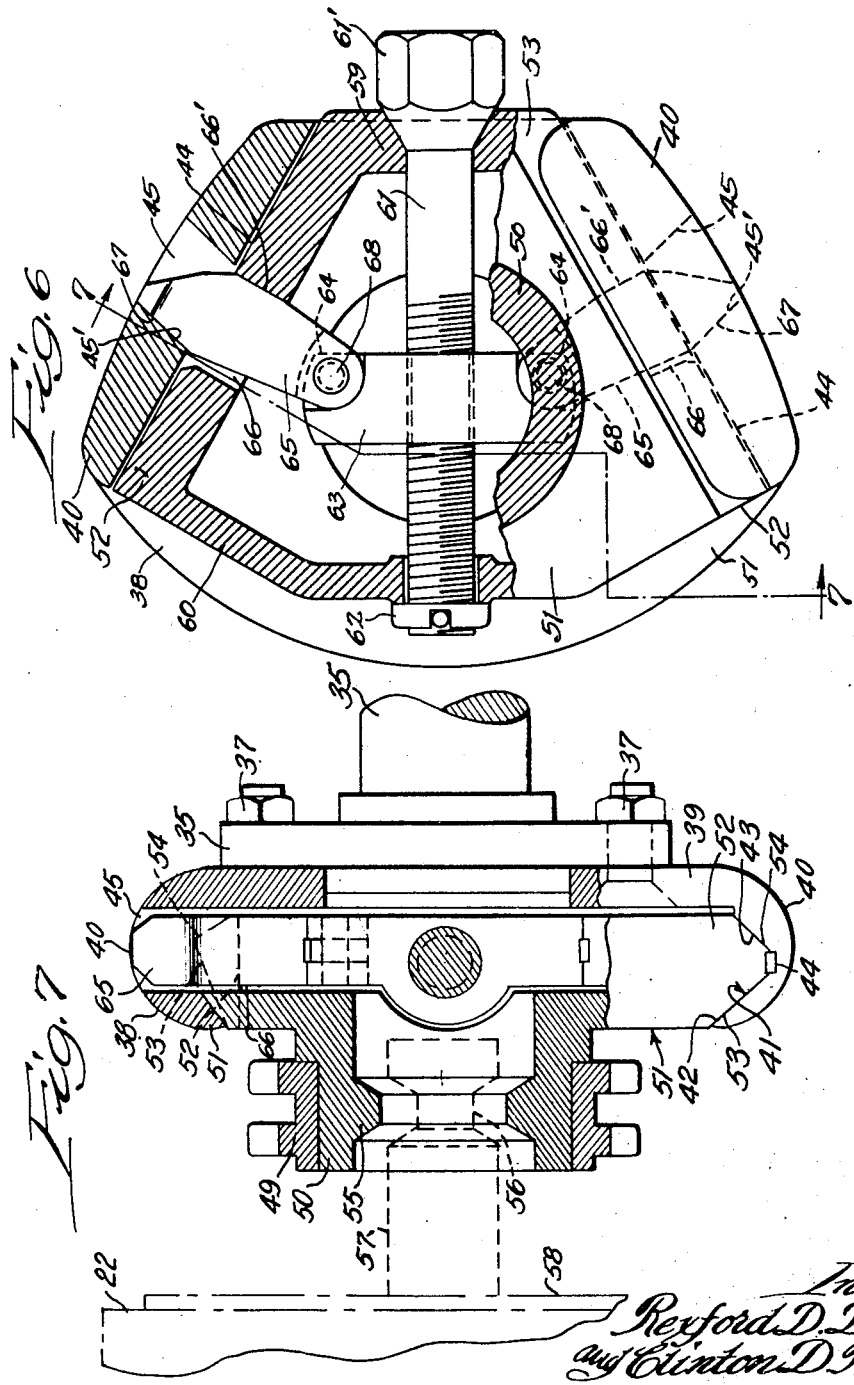

Patented Sept. 20, 1949

2,482,251

UNITED STATES PATENT OFFICE 2,482,251

DETACHABLE POWER DRIVE CONNECTION

Rexford D. Downing and Clinton D. Prosser, Rock Island, Ill., assignors to International Harvester Company, a corporation of New Jersey Application October 24, 1945, Serial No. 624,298

13 Claims. (Cl. 180—53)

This invention relates to a detachable coupling device for the transmission of power. More specifically, it relates to a detachable coupling device particularly adaptable for use on a tractor-mounted implement operated by power from the tractor.

Agricultural tractors for many years have been designed for the direct mounting of various types of tools, particularly those utilized for tillage and planting. More recently harvesting machines of various types, such as corn pickers, have been mounted directly on tractors using power obtained from the power plant of the tractor for operating the mechanism of the harvesting device. Such implements require a disconnectable power coupling device adaptable to transmit power from a power shaft on a tractor to a drive means on the implement which is readily detachable for dismounting the implement from the tractor.

A principal object of the invention is to provide an improved detachable power coupling device.

Another principal object is to provide a coupling device consisting of two structures, one of which is carried by a source of power and the other of which, when removed, may be carried in proximate coupling position by a structure supporting a driven element.

Another principal object is to provide a coupling device which may be brought into coupling position by relative longitudinal movement of two structures carrying cooperating coupling elements.

Another principal object is to provide a coupling device particularly adapted for tractor-mounted implements which can be brought into proximate position by relative movement of the tractor and the implement and which may be subsequently secured in power transmitting position from a remote point by an operator of the tractor.

The above objects and others which will be apparent from the detailed description to follow are accomplished by a construction such as shown in the drawings, in which:

Figure 1 is a plan view of a tractor-mounted implement incorporating the coupling device of the invention in its particular cooperating relationship between the tractor and the implement;

Figure 2 is an elevation of the front portion of the structures shown in Figure 1 with certain lines in dot-dash indicating the wheel and tractor position;

Figure 3 is an end view of a coupling structure as illustrated in Figure 2;

Figure 4 is a sectional view through a power shaft showing a coupling structure adapted to cooperate with the structure of Figure 3;

Figure 5 is a section taken substantially on the line 5—5 of Figure 2;

Figure 6 is a sectional view showing the assembly position of the coupling structures of Figures 3 and 4; and Figure 7 is a section taken on the line 7—7 of Figure 6.

In Figure 1 of the drawings, a tractor with an attached harvester thresher is diagrammatically indicated. The tractor includes a narrow body portion 10 having steerable wheels 11 and a super structure 12 which includes a fuel tank. A short rear axle housing 13 at one side of the narrow body 10 supports a drive axle 14 on which a traction wheel 15 is mounted. A long rear axle housing 16 at the other side of the tractor body 10 supports a drive axle 17 on which a traction wheel 18 is mounted. A steering column 19 which carries a conventional steering wheel 20 is shown in position adjacent an operator's station 21. The tractor described up to this point is a tricycle tractor differing from conventional design in the respect that one traction wheel is narrowly spaced from the tractor body, while the other traction wheel is widely spaced from the tractor body.

A harvester thresher is diagrammatically illustrated as being mounted on the offset tricycle tractor as above described. Said harvester thresher includes a thresher part 22 mounted between the traction wheel 18 and the tractor body 10. Said thresher body is supported on the long rear axle housing 16 by any conventional means and at the normal front end of the tractor by a bracket 23, as shown in Figure 1. A harvester part 24 is pivotally mounted on the thresher part 22 as indicated by the pivot 25, shown in Figure 2. The said harvester part, as shown in Figure 1, includes a conventional reel 26, a cutting mechanism 27, a grain receiving platform 28, a long auger 29, a short auger 30, and an upwardly and rearwardly discharge conveyor 31. All of this structure is conventional and has been shown only diagrammatically to illustrate the use of the coupling device of the invention in connection with a tractor-mounted implement.

With a harvester thresher as illustrated, the tractor would be operated in a direction reverse to that of its normal travel. An operator's station 32 is illustrated as well as a steering wheel 33. This steering wheel, as well as the other necessary controls, would be connected to the normal controls of the tractor by any conventional means, the operator being located on a platform 34 connected to the front end of the thresher part 22 by braces 34'.

The tractor is provided with a conventional laterally extending power shaft 35, this power shaft usually being provided with a pulley for operating belt driven machines. An annular flange 36 on the power shaft 35 is secured by bolts 37 to a coupling structure 38. Said structure, in addition to a flat base portion 39 which fits against the flange 36, includes two angularly arranged extending portions 40. Said portions are provided with receiving grooves 41 formed by angle walls 42 and 43. A recess or channel 44 is cut away between said angle walls to provide clearance for a reason to be hereinafter described. Midway their ends the extensions 40 are provided with openings 45, as best shown in Figures 6 and 7.

The thresher part 22 is provided with a laterally extending shaft 46 on which a driving sprocket 47 is secured. Drive chains 48 connect the sprocket 47 with a double sprocket 49 mounted on a sleeve-like hub 50 which extends from a coupling structure 51. Said coupling structure includes diverging portions 52 of the same degree of angularity as the diverging grooves 41 in the extensions 40 of the first described coupling structure. The portions 52 also have angle walls 53 and 54 which correspond in angularity to the walls 42 and 43 which form the grooves 41. It will be seen therefore that the portions 52 are adapted to enter into and fit in the grooves 41 as illustrated in Figures 6 and 7. The recess 44 assures clearance for the apex of the walls 53 and 54 to assure a close fit of said walls with the walls 42 and 43.

The sleeve-like hub 50 is provided internally with a ridge or rib 55. Said rib corresponds in cross-section to an annular channel or recess 56 formed around the end of a stub shaft 57. Said shaft is substantially smaller in diameter than the interior diameter of the hub 50 and is rigidly secured to an attaching plate 58 which in turn is secured to a side wall of the thresher part 22. Figure 5 illustrates the position of the coupling structure 51 when it is detached from the coupling structure 38. The chains 48 permit the coupling member 51 to move laterally and downwardly with the rib 55 engaging the recess 56 of the stub shaft 57, thereby forming a support for the coupling member which prevents its accidental displacement from the stub shaft 57. Said shaft acts to hold the coupling member substantially in alinement with its final positon when coupled to the other coupling structure 38.

In addition to the angle portions 52, the coupling structure 51 is provided with an end wall 59 joining the closer ends of the portions 52 and an end wall 60 of irregular shape joining the spaced apart ends of the portions 52. A bolt 61 extends through alined openings in the end walls 59 and 60, as best shown in Figure 6. Said bolt has a hexagon head 61' abutting the end wall 59. A collar 62 is pinned on the other end of the bolt 61 to provide for free rotation of the bolt and to hold it against endwise movement.

The bolt 61 is threaded throughout a substantial portion of its length, the threaded portion extending through a threaded hole in an attaching member or block 63. Said block is provided with narrow portions 64 at each end to provide ears for pivotally attaching projectable locking members 65. Said members are secured to the attaching member 63 by pivot pins 68.

The members 65 slidably extend through openings 66 formed in the angle portions 52 of the coupling member. In Figure 3, the members are shown in their retracted positions which permits disconnecting the coupling structures. In Figures 6 and 7, the members 65 are shown projected into coupling position with one portion of each member abutting an edge 66' of an opening 66 and another angle portion 67 of each member 65 abutting an angled edge 45' of each opening 45 in the coupling member 38. It will be seen that the members 65 are so shaped with respect to the openings 45 and 66 that by rotating the bolt 61, the attaching member 63 may be moved relative thereto and the members 65 may be projected into position to exert pressure to bring the two coupling members into a fixed position relative to each other. By turning the bolt in an opposite direction, the members 65 may be retracted, thereby disconnecting the two coupling structures. A certain amount of misalinement of the coupling structure when brought into coupling position will be taken care of by the angled projecting ends of the members 65.

A particular feature of the invention is that the coupling structure 38 may be positioned with the portions 40 diverging in a forward direction and the coupling structure 52 may be positioned with the portions 52 converging in a rearward direction with respect to the normal direction of operation of the tractor prior to moving the tractor relative to the movement for the purpose of mounting the implement thereof. The coupling structures are then brought into proximate alinement, slight differences in angular position being taken care of automatically as the two coupling structures telescope together. The tractor operator may then, by means of a long wrench 69, as shown in Figure 1, turn the bolt 61 to lock the two coupling members together, whereby power may be transmitted from the power shaft 35 to the shaft 46 of the harvester thresher. The operation is reversed when the implement is to be detached from the tractor.

It is to be understood that applicants have shown and described only a preferred embodiment of their improved coupling device as used in connection with a tractor-mounted harvester thresher and that all modifications falling within the appended claims are contemplated as their invention.

What is claimed is:

1. A readily detachable power drive connection comprising a supporting structure, a drive member rotatably mounted on said structure, a power input shaft adapted to be mounted on a power supplying structure, said drive member being positionable substantially in alinement with said power shaft, a coupling device including a first coupling structure carried by the power shaft and having spaced diverging grooves therein, a second coupling structure carried by the drive member and having portions extending angularly outwardly, said portions being adapted to engage and mate with said grooves, and laterally projectable members carried by one of the coupling structures, said grooved portions of the other coupling structure having openings through which said projectable members extend to thereby lock the coupling structures together.

2. A readily detachable power drive connection comprising a supporting structure, a drive member rotatably mounted on said structure, a power input shaft adapted to be mounted on a power supplying structure, said drive member being positionable substantially in alinement with said power shaft, a coupling device including a first coupling structure carried by the power shaft and having spaced diverging grooves therein, a second coupling structure carried by the drive member and having portions extending angularly outwardly, said portions being adapted to engage and mate with said grooves, laterally projectable members carried by the second coupling structure, and means to project and retract said projectable members, said grooved portions of the first coupling structure having openings through which said projectable members extend to thereby lock the coupling structures together.

3. A readily detachable power drive connection comprising a supporting structure, a drive member rotatably mounted on said structure, a power input shaft adapted to be mounted on a power supplying structure, said drive member being positionable substantially in alinement with said power shaft, a coupling device including a first coupling structure carried by the power shaft and having spaced diverging grooves therein, a second coupling structure carried by the drive member and having portions extending angularly outwardly, said portions being adapted to engage and mate with said grooves, a bolt rotatably carried by the second coupling structure, an attaching member threaded on said shaft, and laterally projectable members pivotally secured to said attaching member, said grooved portions of the first coupling structure having openings through which said projectable members extend to thereby lock the coupling structures together.

4. A readily detachable power drive connection comprising a supporting structure, a drive member rotatably mounted on said structure, a power input shaft adapted to be mounted on power supplying structure, said drive member being positionable substantially in alinement with said power shaft, a coupling device including a first coupling structure carried by the power shaft and having spaced diverging grooves therein, a second coupling structure carried by the drive member and having portions extending angularly outwardly, said portions being adapted to engage and mate with said grooves, projectable locking members slidably carried with respect to the second coupling structure, a bolt rotatably carried by the second coupling structure, and an attaching element threaded on said bolt, said locking members being pivotally secured to said element, said grooved portions of the first coupling structure having openings through which said projectable locking members extend to thereby lock the coupling structures together.

5. A readily detachable power drive connection comprising a supporting structure, a drive member rotatably mounted on said structure, a power input shaft adapted to be mounted on a power supplying structure, said drive member being positionable substantially in alinement with said power shaft, a coupling device including a first coupling structure carired by the power shaft and having spaced diverging grooves therein, a second coupling structure carried by the drive member and having portions extending angularly outwardly, said portions being adapted to engage and mate with said grooves, projectable locking members slidably carried with respect to the second coupling structure, said coupling structure being provided with openings in the angular portions through which said members are projectable, a bolt rotatably carried by the second coupling structure, and an attaching element threaded on said bolt, said locking members being pivotally secured to said element, said grooved portions of the first coupling structure having openings through which said projectable locking members extend to thereby lock the coupling structures together.

6. A readily detachable power drive connection comprising a supporting struture, a driven shaft on said structure, a sprocket mounted on the said driven shaft, a stub shaft mounted on said structure spaced from said driven shaft, said stub shaft having retaining means therearound, a chain sprocket formed with a central opening substantially larger than said stub shaft and an internal projecting portion engageable with the retaining means on the stub shaft whereby said sprocket is adapted to hang on said stub shaft in engagement with said retaining means, a drive chain surrounding said sprocket and the sprocket on the driven shaft, a power supplying structure, a power input shaft mounted on said power supplying structure, said sprocket on the stub shaft being substantially in alinement with said power shaft, a coupling device including a first coupling structure carried by the power shaft having spaced centrally directed diverging grooves therein, a second coupling structure carried by the stub shaft sprocket having portions extending angularly outwardly, said portions being adapted to engage and mate with said grooves, laterally extensible members carried by the coupling structure on the sprocket, and manually operable means for extending and retracting said members, said grooved portions of the first coupling structure being provided with openings through which said extensible members are projectable to thereby lock the coupling members together.

7. A readily detachable power drive connection comprising a supporting structure, a driven shaft on said structure, a sprocket mounted on the said driven shaft, a stub shaft mounted on said structure spaced from said driven shaft, said stub shaft having retaining means thereon, a chain sprocket formed with a central opening substantially larger than said stub shaft and an internal projecting portion engageable with the retaining means on the stub shaft whereby said sprocket is adapted to hang on said stub shaft in engagement with said retaining means, a drive chain surrounding said sprocket and the sprocket on the driven shaft, a power input shaft mounted on a power supplying structure, said sprocket on the stub shaft being brought into substantial alinement with said power shaft when coupling to effect a drive is to take place, a coupling device including a coupling structure carried by the power shaft having spaced centrally directed diverging grooves therein, a coupling structure carried by the stub shaft sprocket having portions extending angularly outwardly, said portions being adapted to engage and mate with said grooves, laterally projectable members carried by the coupling structure on the sprocket, and means to project said members, said grooved portions of the first coupling structure being provided with openings through which said projectable members are extendible to thereby lock the coupling members together.

8. A readily detachable power drive connection comprising a supporting structure, a driven shaft on said structure, a sprocket mounted on the said driven shaft, a stub shaft mounted on said structure spaced from said driven shaft, said stub shaft having retaining means thereon, a chain sprocket formed with a central opening substantially larger than said stub shaft and an internal projecting portion engageable with the retaining means on the stub shaft whereby said sprocket is adapted to hang on said stub shaft in engagement with said retaining means, a drive chain surrounding said sprocket and the sprocket on the driven shaft, a power input shaft mounted on a power supplying structure, said sprocket on the stub shaft being brought into substantial alinement with said power shaft when coupling to effect a drive is to take place, a coupling device including a coupling structure carried by the power shaft having spaced centrally directed diverging portions having grooves therein, a coupling structure carried by the stub shaft sprocket having portions extending angularly outwardly, said portions being adapted to engage and mate with said grooves, laterally projectable members carried by the coupling structure on the sprocket, and a bolt having a head portion extending rearwardly, said bolt being rotatable to extend said members, said grooved portions of the first coupling structure being provided with openings through which said projectable members are extendible to thereby lock the coupling members together.

9. A readily detachable power drive connection comprising a supporting structure, a driven shaft on said structure, a sprocket mounted on the said driven shaft, a stub shaft mounted on said structure spaced from said driven shaft, said stub shaft having retaining means therearound, a chain sprocket formed with a central opening substantially larger than said stub shaft and an internal projecting portion engageable with the retaining means on the stub shaft whereby said sprocket is adapted to hang on said stub shaft in engagement with said retaining means, a drive chain surrounding said chain sprocket and the sprocket on the driven shaft, a power supplying structure, a power input shaft mounted on said power supplying structure, said sprocket on the stub shaft being substantially in alinement with said power shaft, a coupling device including a first coupling structure carried by the power shaft having spaced centrally directed diverging portions with grooves therein, a second coupling structure carried by the stub shaft sprocket having portions extending angularly outwardly, said portions being adapted to engage and mate with said grooves, said portions being formed with openings, laterally projectable members extending through said openings, a bolt rotatably extending through said second coupling member, and an attaching block threaded on said bolt, said projecting members being pivotally secured to said block for movement thereby, said diverging portions of the first coupling structure being provided with openings through which said extensible members are projectable to thereby lock the coupling structure together.

10. A readily detachable power drive connection comprising in combination with a tractor having a laterally extending power shaft and an implement removably mounted on and alongside the tractor and having a laterally extending driven shaft, a chain sprocket mounted on the said driven shaft, a stub shaft mounted on the implement spaced from said driven shaft, said stub shaft having an annular groove therearound, a second chain sprocket formed centrally with an opening substantially larger than said stub shaft and being formed internally to hang on said stub shaft in eccentric relation thereto in engagement with said groove, a drive chain surrounding said sprocket and the sprocket on the driven shaft, said second sprocket on the stub shaft being substantially in alinement with the tractor power shaft when the implement is in operative position on the tractor, a coupling device including a first coupling structure carried by the tractor power shaft and having spaced inwardly facing forwardly diverging grooves therein, a second coupling structure carried by the second sprocket having portions extending angularly outward in a forward direction, said portions of the second coupling structure being formed to mate with and adapted to engage the grooves of the first coupling member when the implement is moved into position on the tractor, and means to lock said coupling structures together.

11. A readily detachable power drive connection comprising in combination with a tractor having a laterally extending power shaft and an implement removably mounted on and alongside the tractor and having a laterally extending driven shaft, a chain sprocket mounted on the said driven shaft, a stub shaft mounted on the implement spaced from said driven shaft, said stub shaft having an annular groove therearound, a second chain sprocket formed centrally with an opening substantially larger than said stub shaft and being formed internally to hang on said stub shaft in eccentric relation thereto in engagement with said groove, a drive chain surrounding said sprocket and the sprocket on the driven shaft, said second sprocket on the stub shaft being substantially in alinement with the tractor power shaft when the implement is in operative position on the tractor, a coupling device including a first coupling structure carried by the tractor power shaft and having spaced inwardly facing diverging grooves therein, a second coupling structure carried by the second sprocket having portions extending angularly outwardly, said portions being formed to mate with and adapted to engage the grooves of the first coupling structure when said coupling structures are placed in angular positions by movement of the implement into position on the tractor and thus forcing the diverging grooves rearwardly and the angular extending portions of the second coupling structure forwardly, laterally projectable members carried by the second coupling structure, and means to project said members, said grooved portions of the first coupling structure having openings through which said projectable members are extendible to lock the coupling structures together whereby an operator located on the tractor at a spaced position from said drive connection may, by operation of a long-handled wrench, rotate said bolt and thereby engage or disengage the projectable members with respect to the first coupling structure carried on the tractor power shaft.

12. A readily detachable power drive connection comprising in combination with a tractor having a laterally extending power shaft and an implement removably mounted on and alongside the tractor and having a laterally extending driven shaft, a chain sprocket mounted on the said driven shaft, a stub shaft mounted on the implement spaced from said driven shaft, said stub shaft having an annular groove therearound, a second chain sprocket formed centrally with an opening substantially larger than said stub shaft and being formed internally to hang on said stub shaft in eccentric relation thereto in engagement with said groove, a drive chain surrounding said sprocket and the sprocket on the driven shaft, said second sprocket on the stub shaft being substantially in alinement with the tractor power shaft when the implement is in operative position on the tractor, a coupling device including a first coupling structure carried by the tractor power shaft and having spaced inwardly facing forwardly diverging grooves therein, a second coupling structure carried by the second sprocket having portions extending angularly outward in a forward direction, said portions being formed to mate with and adapted to engage the grooves of the first coupling member when the implement is moved into position on the tractor, laterally extensible members carried by the second coupling structure, and a bolt having a head portion extending rearwardly when the coupling members are in attaching position, said bolt being rotatable to extend said members, said grooved portions of the first coupling structure having openings through which said extensible members are projectable to lock the coupling structures together whereby an operator located on the tractor at a spaced position from said drive connection may, by the operation of a long-handled wrench, rotate said bolt and thereby engage or disengage the extensible members with respect to the first coupling structure carried on the tractor power shaft.

13. A readily detachable power drive connection comprising in combination with a tractor having a laterally extending power shaft and an implement removably mounted on and alongside the tractor and having a laterally extending driven shaft, a chain sprocket mounted on the said driven shaft, a stub shaft mounted on the implement spaced from said driven shaft, said stub shaft having an annular groove therearound, a second chain sprocket formed centrally with an opening substantially larger than said stub shaft and being formed internally to hang on said stub shaft in eccentric relation thereto in engagement with said groove, a drive chain surrounding said sprocket and the sprocket on the driven shaft, said second sprocket on the stub shaft being substantially in alinement with the tractor power shaft when the implement is in operative position on the tractor, a coupling device including a first coupling structure carried by the tractor power shaft and having spaced inwardly facing forwardly diverging grooves therein, a second coupling structure carried by the second sprocket having portions extending angularly outward in a forward direction, said portions being formed to mate with and adapted to engage the grooves of the first coupling member when the implement is moved into position on the tractor, said portions being formed with openings, laterally projectable members extending through said openings, and a bolt rotatably extending through said second coupling structure and held against axial movement relative thereto, a block threaded on said bolt, said projectable members being pivoted on said block at an angle to the axis of the bolt whereby they are projected and retracted by rotation of the bolt, said grooved portions of the first coupling structure having openings through which said members are projectable to lock the coupling structures together whereby an operator located on the tractor at a spaced position from said drive connection may, by the operation of a long-handled wrench, rotate said bolt and thereby engage or disengage the extensible members with respect to the first coupling structure carried on the tractor power shaft.

REXFORD D. DOWNING.
CLINTON D. PROSSER.

REFERENCES CITED

The following references are of record in the file of this patent:

UNITED STATES PATENTS

| Number | Name | Date |
|---|---|---|
| 1,181,285 | Baughman | May 2, 1916 |
| 1,535,419 | Jarfas, Jr. | Apr. 28, 1925 |
| 2,031,399 | White | Feb. 18, 1936 |
| 2,034,919 | Olson | Mar 24, 1936 |
| 2,404,775 | Ehmann | July 30, 1946 |